(12) United States Patent
Arai

(10) Patent No.: US 9,412,059 B2
(45) Date of Patent: Aug. 9, 2016

(54) CARD BODY, A MANUFACTURING METHOD FOR AN IC CARD, AND THE IC CARD

(71) Applicant: Kabushiki Kaisha Toshiba, Tokyo (JP)

(72) Inventor: Hideaki Arai, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/471,036

(22) Filed: Aug. 28, 2014

(65) Prior Publication Data

US 2015/0076239 A1  Mar. 19, 2015

(30) Foreign Application Priority Data

Sep. 18, 2013  (JP) .................................. 2013-193366

(51) Int. Cl.
  *G06K 19/077* (2006.01)

(52) U.S. Cl.
  CPC ........ *G06K 19/07732* (2013.01); *G06K 19/077* (2013.01); *G06K 19/07739* (2013.01); *G06K 19/07747* (2013.01); *Y10T 29/49117* (2015.01)

(58) Field of Classification Search
  CPC .................. G06K 19/07732; G06K 19/07747
  USPC .................................................. 235/492, 451
  See application file for complete search history.

(56) References Cited

U.S. PATENT DOCUMENTS

| | | |
|---|---|---|
| 5,936,227 A | 8/1999 | Trugglemann et al. |
| 6,448,638 B1 | 9/2002 | Fidalgo et al. |
| 6,685,097 B1 | 2/2004 | Housse |
| 7,086,601 B2 | 8/2006 | Dhers et al. |
| 2005/0230485 A1* | 10/2005 | Ross ................ G06K 19/07739 235/492 |
| 2006/0155913 A1* | 7/2006 | Nishikawa ........... G06K 7/0004 711/100 |
| 2007/0152068 A1* | 7/2007 | Kurita ................. G06F 21/6218 235/492 |
| 2013/0116010 A1* | 5/2013 | Lepp .................... G06K 19/077 455/558 |
| 2015/0149776 A1* | 5/2015 | Chastain ............... H04L 9/0861 713/169 |

FOREIGN PATENT DOCUMENTS

FR  2773900 A1  7/1999
JP  2002-366911 A  12/2001

OTHER PUBLICATIONS

Invitation to Response to Written Opinion and Search Report issued in related Singapore application 10201405176S, mailed on Jun. 12, 2015. 9 pages.
Extended European Search Report issued in related European Patent Application No. 1418266.7 mailed Feb. 16, 2015, 6 pages.

* cited by examiner

*Primary Examiner* — Allyson Trail
(74) *Attorney, Agent, or Firm* — Baker Botts L.L.P.

(57) ABSTRACT

According to one embodiment, a card body includes a card part onto which an IC module is to be mounted, and a bracket part to support the card part. The card part includes a bevel. The bracket part includes a hole, a first bridge part, a second bridge part, a first break-off line, and a second break-off line. The hole is formed at a circumference of the card part. The first bridge part connects the bracket part and the card part. The second bridge part connects the bracket part and the card part. The second bridge part is provided at a farer position from the bevel than the first bridge part. The first break-off line is provided with a first depth at the first bridge part. The second break-off line is provided with a second depth at the second bridge part. The second depth is shallower than the first depth.

11 Claims, 3 Drawing Sheets

CARD BODY, A MANUFACTURING METHOD FOR AN IC CARD, AND THE IC CARD

CROSS-REFERENCE TO RELATED APPLICATION

This application is based upon and claims the benefit of priority from Japanese Patent Application No. 2013-193366, filed on Sep. 18, 2013; the entire contents of which are incorporated herein by reference.

FIELD

Embodiments described herein relate generally to a card body, a manufacturing method for an IC card, and the IC card.

BACKGROUND

In general, an IC card (used as a portable electric device) equips a card type main body (formed plastically) and an IC module (embedded into the main body). The IC card is manufactured by following steps. For example, a card body having ID-1 size (regulated by International Standard "ISO/IEC7810:2003") is subjected to milling, an IC module is embedded into a recess formed by the milling, and the break-off line is formed around the IC module on the card body by half-cutting. As a result, an IC card having a smaller size than the ID-1 size is in a condition capable of being separated by hand. From the card body to which above-mentioned processing was performed, by separating an IC card by hand, the IC card usable as a Subscriber Identity Module (SIM) card is manufactured.

As the SIM card, for example, several types such as a Plug-in Universal Integrated Circuit Card (UICC) and a Mini-UICC Fourth Form Factor (4FF), which are regulated by ETSI TS 102221, are known. However, a size of this SIM card is extremely smaller than the ID-1 size. Accordingly, it is difficult for a user to separate the SIM card from the card body by the user's hand.

DETAILED DESCRIPTION

According to one embodiment, a card body includes a card part onto which an IC module is to be mounted, and a bracket part to support the card part. The IC module includes an IC chip and a contact pattern. The card part includes a bevel. The bracket part includes a hole, a first bridge part, a second bridge part, a first break-off line, and a second break-off line. The hole is formed at a circumference of the card part. The first bridge part connects the bracket part and the card part. The second bridge part connects the bracket part and the card part. The second bridge part is provided at a farer position from the bevel than the first bridge part. The first break-off line is provided with a first depth at the first bridge part. The second break-off line is provided with a second depth at the second bridge part. The second depth is shallower than the first depth.

Hereinafter, a card body, a manufacturing method for an IC card, and the IC card according to one embodiment will be described hereinafter with reference to the accompanying drawings.

Figure 1:
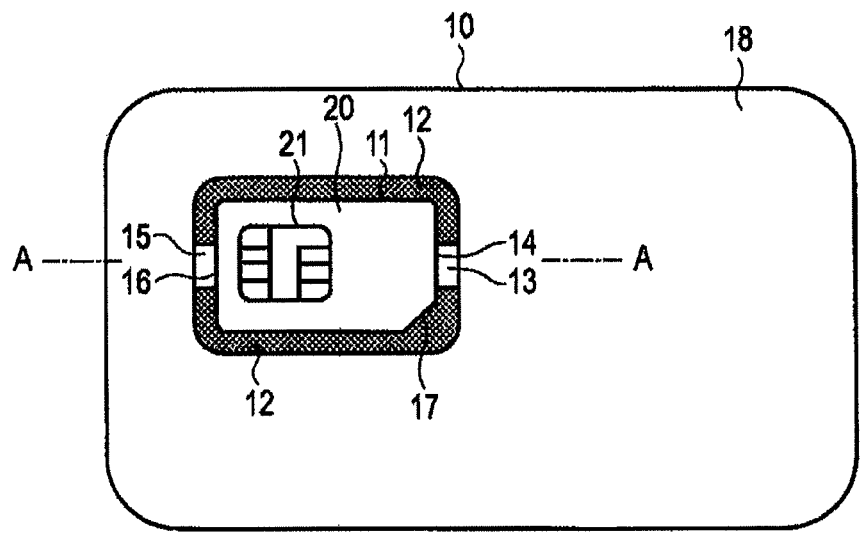
FIG. 1 is a schematic diagram to explain a first example of a card body according to one embodiment.
Figure 2:
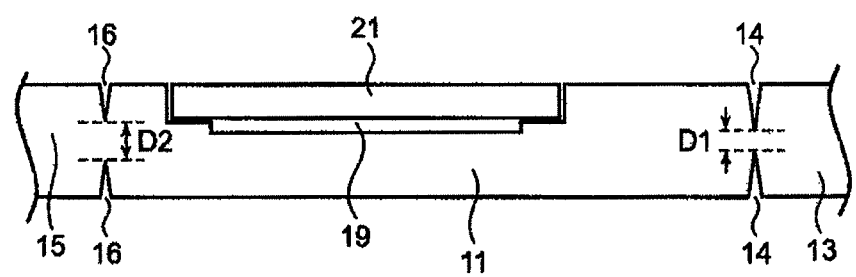
FIG. 2 is another schematic diagram to explain the first example of the card body according to one embodiment.

FIG. 1 shows a first example of a card body 10 according to one embodiment. Furthermore, FIG. 2 shows a sectional plan of the card body 10 when a part thereof is cut out along A-A line of FIG. 1.

For example, the card body 10 is a rectangular body formed by material such as plastic. The card body 10 equips a card part 11 and a bracket part 18.

The card part can be separated as a card and used as the IC card such as SIM card. As shown in FIG. 2, the card part 11 includes a recess 19 formed by milling. An IC module 21 is embedded into the recess 19. For example, the IC module 21 is fixed onto the card part 11 of the card body 10 by an adhesive or an adhesive tape.

The IC module 21 equips an IC chip (LSI) and a contact pattern. The LSI equips a CPU, a ROM, a RAM, a nonvolatile memory, a power supply, a coprocessor, and a communication unit.

The CPU is an operation element to perform various operations. Based on control program and control data stored in the ROM or the nonvolatile memory, the CPU executes various processing. The ROM is a nonvolatile memory to previously store the control program and the control data. The RAM is a volatile memory functioned as a working memory. The RAM temporarily stores data being processed by the CPU. The nonvolatile memory equips, for example, a writable/rewritable memory such as EEPROM. The nonvolatile memory stores, for example, the control program, the control data, an application, security information such as personal information and encryption key, and data used for the application.

The contact pattern is a contact terminal formed on a surface of the IC module with a metal having conductivity. Namely, the contact pattern is formed so as to contact with a terminal device. The contact pattern is formed by dividing the metallic face into a plurality of cells. Each divided cell functions as a terminal of the IC module respectively. Namely, the IC module 21 is electrically connected to a card reader/writer of the terminal device via the contact pattern.

The bracket part 18 is a card base to support the card part 11. By performing various processing to the bracket part 18, the bracket part 18 becomes in a condition that the card part 11 (i.e., IC card 20) can be easily separated therefrom by hand.

After the IC module 21 is embedded into the recess 19 of the card part 11, punching is performed to the bracket part 18 of the card body 10. The punching is processing to form a hole piercing through the card body 10. As a result, as shown in FIG. 1, a hole 12 is formed around the card part 11. Furthermore, a first bridge part 13 and a second bridge part 15 are formed as parts remained by the punching.

The first bridge part 13 is provided at a short side of the rectangular card part 11, and supports the card part 11 from the bracket part 18. The second bridge part 15 is provided at a short side of the card part 11 (the opposite side of the first bridge part 13), and supports the card part 11 from the bracket part 18. The hole 12 is formed at a circumference of the card part 11 excluding the first bridge part 13 and the second bridge part 15.

Furthermore, a bevel 17 is formed on the card part 11 by punching. The bevel 17 is a part for a user to recognize an insertion direction of the card when the IC card 20 is utilized. As shown in FIG. 1, the bevel is formed by punching so that one corner of the rectangular card part 11 is broken off in comparison with other corners. As a result, an area of the hole 12 (formed by punching) adjacent to the bevel 17 is larger than an area of the hole 12 adjacent to the respective other holes.

After the hole 12, the first bridge part 13 and the second bridge part 15 are formed by punching the circumference of the card part 11, the first bridge part 13 and the second bridge part 15 are subjected to half-cutting. The half-cutting is processing to form a break-off line on both sides of the card body 10. By this half-cutting, the break-off line is respectively formed at a connection part between the card part 11 and the first bridge part 13, and at a connection part between the card part 11 and the second bridge part 15. As a result, as shown in FIGS. 1 and 2, a first break-off line 14 is formed at the connection part between the card part 11 and the first bridge part 13, and a second break-off line 16 is formed at the connection part between the card part 11 and the second bridge part 15.

As shown in FIG. 2, the first break-off line 14 is formed at both sides of the card body 10 so that a thickness of the card body 10 is equal to a first thickness D1. Furthermore, the second break-off line 16 is formed at both sides of the card body 10 so that a thickness of the card body 10 is equal to a second thickness D2. Here, the first thickness D1 is shorter than the second thickness D2, i.e., D1<D2.

Namely, the first break-off line 14 is formed with a deeper depth than the second break-off line 16. In other words, the second break-off line 16 is formed with a shallower depth than the first break-off line 14.

Moreover, the first bridge part 13 is provided at a position nearer to the bevel 17 than the second bridge part 15. In other words, the second bridge part 15 is provided at a position farer from the bevel 17 than the first bridge part 13. Namely, the first break-off line 14 is provided at a position nearer to the bevel 17 in comparison with the second break-off line 16. Namely, the first break-off line 14 having a deeper depth than the second break-off line 16 is formed at a position nearer to the bevel 17.

From the card body 10 to which above processing is performed, by separating an IC card 20 by hand, the IC card 20 usable as a Subscriber Identity Module (SIM) card is manufactured. Here, as to the card body 10, an area of the hole 12 adjacent to the bevel 17 is larger than an area of the hole 12 adjacent to respective other corners. As a result, by catching the hole 12 adjacent to the bevel 17 with the user's finger, the user can easily separate the card part 11 from the card body 10.

As to the card body 10 according to the present embodiment, the first bridge part 13 is formed at a position nearer to the bevel 17, and the second bridge part 15 is formed at a position farer from the bevel 17. Furthermore, the first bridge part 13 includes the first break-off line 14 formed with a deeper depth than the second break-off line 16 of the second bridge part 15.

As a result, when the user catches the hole 12 adjacent to the bevel 12 with his/her finger, first, the card part 11 is separated from the bracket part 18 at the first break-off line 14. After the card part 11 is separated from the bracket part 18 at the first break-off line 14, the card part 11 can be mover along top and bottom direction in FIG. 2. Accordingly, the user can easily separate the card part 11 from the bracket part 18 at the second break-off line 16. Namely, by cutting the first break-off line 14 and the second break-off line 16 with pressure, the card part 11 is separated from the bracket part 18, i.e., the IC card 20 is produced.

As mentioned-above, by forming the break-off line having a deeper depth at a position easy to add power by hand, the card body 10 from which the IC card 20 can be easily separated is supplied. As a result, the card body from which the IC card can be easily separated, a manufacturing method for the IC card, and the IC card, are supplied.

Moreover, in above-mentioned embodiment, the first bridge part 13 and the second bridge part 15 are formed at respective short sides of the rectangular card part 11. However, the present embodiment is not limited to this component. The first bridge part 13 and the second bridge part 15 may be formed at respective long sides of the rectangular card part 11.

Figure 3:
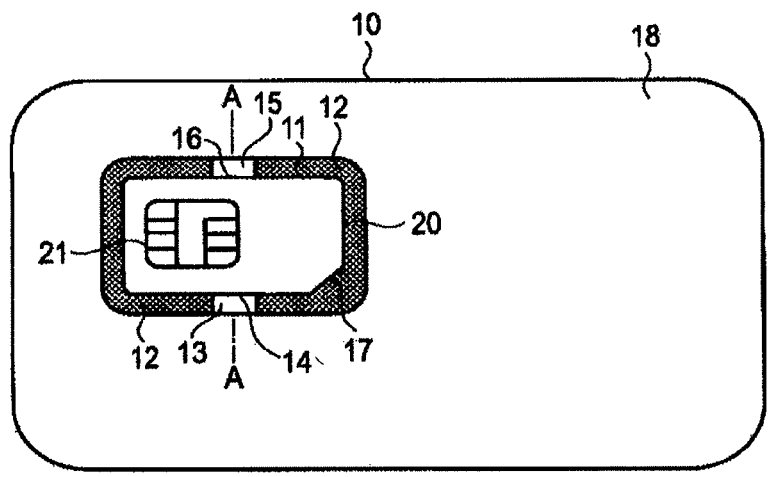
FIG. 3 is a schematic diagram to explain a second example of a card body according to one embodiment.

FIG. 3 shows a second example of the card body 10 according to one embodiment. In the second example of FIG. 3, the first bridge part 13 is provided at a long side of the rectangular card part 11, and supports the card part 11 from the bracket part 18. The second bridge part 15 is provided at a long side of the card part 11 (the opposite side of the first bridge part 13), and supports the card part 11 from the bracket part 18. The hole 12 is formed at a circumference of the card part 11 excluding the first bridge part 13 and the second bridge part 15. Furthermore, the bevel 17 is formed on the card part 11 by punching.

After the hole 12, the first bridge part 13 and the second bridge part 15 are formed by punching the circumference of the card part 11, the first bridge part 13 and the second bridge part 15 are subjected to half-cutting. By this half-cutting, a break-off line is respectively formed at a connection part between the card part 11 and the first bridge part 13, and at a connection part between the card part 11 and the second bridge part 15. As a result, the first break-off line 14 is formed at the connection part between the card part 11 and the first bridge part 13, and the second break-off line 16 is formed at the connection part between the card part 11 and the second bridge part 15.

Moreover, if a part of the card body 10 is cut out along A-A line of FIG. 3, this sectional plan represents the same component as FIG. 2.

As shown in FIG. 2, the first break-off line 14 (at the long side of the card part 11) is formed at both sides of the card body 10 so that a thickness of the card body 10 is equal to a first thickness D1. Furthermore, the second break-off line 16 (at the long side of the card part 11) is formed at both sides of the card body 10 so that a thickness of the card body 10 is equal to a second thickness D2. Here, the first thickness D1 is shorter than the second thickness D2, i.e., D1<D2.

Namely, the first break-off line 14 is formed with a deeper depth than the second break-off line 16. In other words, the second break-off line 16 is formed with a shallower depth than the first break-off line 14.

The first bridge part 13 is provided at a position nearer to the bevel 17 than the second bridge part 15. In other words, the second bridge part 15 is provided at a position farer from the bevel 17 than the first bridge part 13. Namely, the first break-off line 14 is provided at a position nearer to the bevel 17 in comparison with the second break-off line 16. Namely, the first break-off line 14 having a deeper depth than the second break-off line 16 is formed at a position nearer to the bevel 17.

In the second example, in the same way as the first example, the break-off line having a deeper depth is formed at a position easy to add power by hand. Accordingly, the user can easily separate the IC card 20 from the card body 10. As a result, the card body from which the IC card can be more easily separated, a manufacturing method for the IC card, and the IC card, are supplied.

Furthermore, a width of the first bridge part 13 may be narrower than a width of the second bridge part 15.

Figure 4:
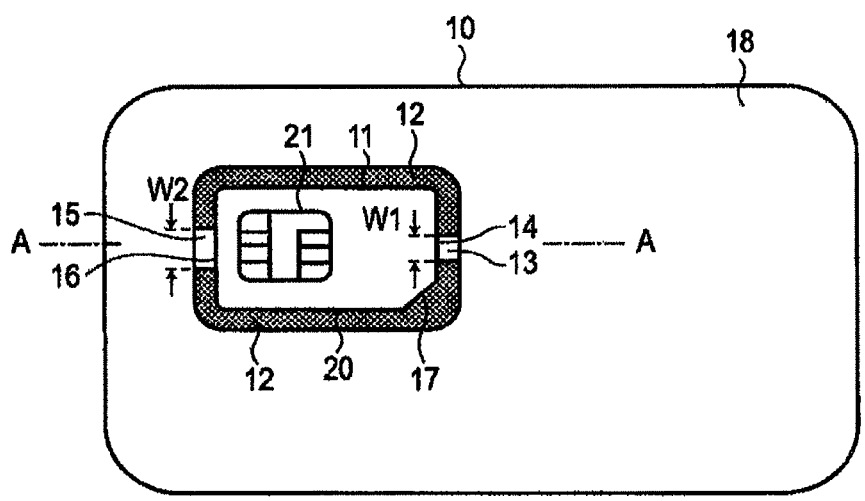
FIG. 4 is a schematic diagram to explain a third example of a card body according to one embodiment.

FIG. 4 shows a third example of the card body 10 according to one embodiment. In the third example of FIG. 4, the first bridge part 13 is provided at a short side of the rectangular card part 11, and supports the card part 11 from the bracket part 18. The second bridge part 15 is provided at a short side of the card part 11 (the opposite side of the first bridge part 13), and supports the card part 11 from the bracket part 18. The hole 12 is formed at a circumference of the card part 11 excluding the first bridge part 13 and the second bridge part 15.

Here, a width of the first bridge part 13 is W1. Furthermore, a width of the second bridge part 15 is W2. The width W1 is narrower than the width W2, i.e., W1<W2. Namely, the first bridge part 13 is formed with a narrower width than the second bridge unit 15. In other words, the second bridge part 15 is formed with a wider width than the first bridge part 13. Furthermore, the bevel 17 is formed on the card part 11 by punching.

After the hole 12, the first bridge part 13 and the second bridge part 15 are formed by punching the circumference of the card part 11, the first bridge part 13 and the second bridge part 15 are subjected to half-cutting. By this half-cutting, a break-off line is respectively formed at a connection part between the card part 11 and the first bridge part 13, and at a connection part between the card part 11 and the second bridge part 15. As a result, the first break-off line 14 is formed at the connection part between the card part 11 and the first bridge part 13, and the second break-off line 16 is formed at the connection part between the card part 11 and the second bridge part 15.

Moreover, if a part of the card body 10 is cut out along A-A line of FIG. 4, this sectional plan represents the same component as FIG. 2.

As shown in FIG. 2, the first break-off line 14 (at the short side of the card part 11) is formed at both sides of the card body 10 so that a thickness of the card body 10 is equal to a first thickness D1. Furthermore, the second break-off line 16 (at the short side of the card part 11) is formed at both sides of the card body 10 so that a thickness of the card body 10 is equal to a second thickness D2. Here, the first thickness D1 is shorter than the second thickness D2, i.e., D1<D2.

Namely, the first break-off line 14 is formed with a deeper depth than the second break-off line 16. In other words, the second break-off line 16 is formed with a shallower depth than the first break-off line 14.

Moreover, the first bridge part 13 is provided at a position nearer to the bevel 17 than the second bridge part 15. In other words, the second bridge part 15 is provided at a position farer from the bevel 17 than the first bridge part 13.

In this case, the first break-off line 14 is provided with a narrower width than the second break-off line 16, at a position nearer to the bevel 17 in comparison with the second break-off line 16. Namely, the first break-off line 14 having a deeper depth and a narrower width than the second break-off line 16 is formed at a position nearer to the bevel 17. If a width of the first bridge part 13 is narrower than a width of the second bridge part 15, an area of a connection part between the card part 11 and the bracket part 18 is narrower. Accordingly, the user can more easily separate the IC card 20 from the card body 10.

Namely, the break-off line having a deeper depth and a narrower width is formed at a position easy to add power by hand. Accordingly, the user can easily separate the IC card 20 from the card body 10. As a result, the card body from which the IC card can be more easily separated, a manufacturing method for the IC card, and the IC card, are supplied.

Furthermore, as shown in FIG. 3, the first bridge part 13 and the second bridge part 15 may be provided at the long side of the card part 11 respectively, and a width of the first bridge part 13 may be narrower than a width of the second bridge part 15.

Figure 5:
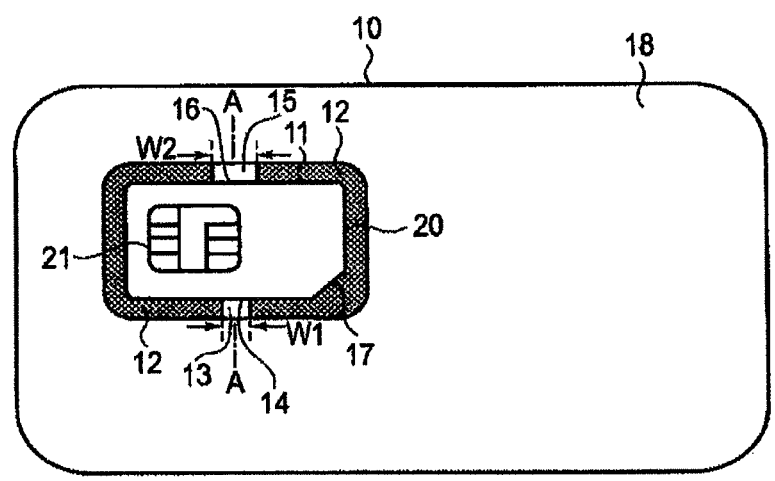
FIG. 5 is a schematic diagram to explain a fourth example of a card body according to one embodiment.

FIG. 5 shows a fourth example of the card body 10 according to one embodiment. In the fifth example of FIG. 5, the first bridge part 13 is provided at a long side of the rectangular card part 11, and supports the card part 11 from the bracket part 18. The second bridge part 15 is provided at a long side of the card part 11 (the opposite side of the first bridge part 13), and supports the card part 11 from the bracket part 18. The hole 12 is formed at a circumference of the card part 11 excluding the first bridge part 13 and the second bridge part 15.

Here, a width of the first bridge part 13 is W1. Furthermore, a width of the second bridge part 15 is W2. The width W1 is narrower than the width W2, i.e., W1<W2. Namely, the first bridge part 13 is formed with a narrower width than the second bridge unit 15. Furthermore, the bevel 17 is formed on the card part 11 by punching.

After the hole 12, the first bridge part 13 and the second bridge part 15 are formed by punching the circumference of the card part 11, the first bridge part 13 and the second bridge part 15 are subjected to half-cutting. By this half-cutting, a break-off line is respectively formed at a connection part between the card part 11 and the first bridge part 13, and at a connection part between the card part 11 and the second bridge part 15. As a result, the first break-off line 14 is formed at the connection part between the card part 11 and the first bridge part 13, and the second break-off line 16 is formed at the connection part between the card part 11 and the second bridge part 15.

Moreover, if a part of the card body 10 is cut out along A-A line of FIG. 5, this sectional plan represents the same component as FIG. 2.

As shown in FIG. 2, the first break-off line 14 (at the long side of the card part 11) is formed at both sides of the card body 10 so that a thickness of the card body 10 is equal to a first thickness D1. Furthermore, the second break-off line 16 (at the long side of the card part 11) is formed at both sides of the card body 10 so that a thickness of the card body 10 is equal to a second thickness D2. Here, the first thickness D1 is shorter than the second thickness D2, i.e., D1<D2.

Namely, the first break-off line 14 is formed with a deeper depth than the second break-off line 16. In other words, the second break-off line 16 is formed with a shallower depth than the first break-off line 14.

Moreover, the first bridge part 13 is provided at a position nearer to the bevel 17 than the second bridge part 15. In other words, the second bridge part 15 is provided at a position farer from the bevel 17 than the first bridge part 13.

In this case, the first break-off line 14 is provided with a narrower width than the second break-off line 16, at a position nearer to the bevel 17 in comparison with the second break off line 16. Namely, the first break-off line 14 having a deeper depth and a narrower width than the second break-off line 16 is formed at a position nearer to the bevel 17. If a width of the first bridge part 13 is narrower than a width of the second bridge part 15, an area of a connection part between the card part 11 and the bracket part 18 is narrower. Accordingly, the user can more easily separate the IC card 20 from the card body 10.

Namely, the break-off line having a deeper depth and a narrower width is formed at a position easy to add power by hand. Accordingly, the user can easily separate the IC card 20 from the card body 10. As a result, the card body from which the IC card can be more easily separated, a manufacturing method for the IC card, and the IC card, are supplied.

In above-mentioned embodiment, the half-cutting is performed after the punching. However, order of processing steps is not limited to this. The punching may be performed after the half-cutting.

Furthermore, in above-mentioned embodiment, the second bridge part 15 is provided with the card part 11 at the opposite side of the first bridge part 13. However, respective positions of the first bridge part 13 and the second bridge part 15 are not limited to this component. The respective positions may be any position, only if the first bridge part 13 provided at a position nearer to the bevel 17 in comparison with the second bridge part 15.

Furthermore, in above-mentioned embodiment, the first break-off line 14 and the second break-off line 16 are respectively formed at both sides of the card body 10. However, the first break-off line 14 and the second break-off line 16 are not limited to this component. The first break-off line 14 and the second break-off line 16 may be formed at one side of the card body 10.

While certain embodiments have been described, these embodiments have been presented by way of examples only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A card body comprising:
    a card part onto which an IC module is to be mounted, the IC module including an IC chip and a contact pattern; and
    a bracket part to support the card part;
    wherein
    the card part includes a bevel, and
    the bracket part includes
    a hole formed at a circumference of the card part,
    a first bridge part connecting the bracket part and the card part,
    a second bridge part connecting the bracket part and the card part, the second bridge part is provided at a farer position from the bevel than the first bridge part,
    a first break-off line provided at both surfaces of a connection part between the card part and the first bridge part so that a thickness of the connection part is equal to a first thickness, and
    a second break-off line provided at both surfaces of a connection part between the card part and the second bridge part so that a thickness of the connection part is equal to a second thickness, the first thickness being shorter than the second thickness.

2. The card body according to claim 1, wherein
    the card part has a rectangular shape,
    the first bridge part is provided at a short side of the card part nearer to the bevel, and
    the second bridge part is provided at another short side of the card part as the opposite side of the first bridge part.

3. The card body according to claim 1, wherein
    the card part has a rectangular shape,
    the first bridge part is provided at a long side of the card part nearer to the bevel, and
    the second bridge part is provided at another long side of the card part as the opposite side of the first bridge part.

4. The card body according to claim 1, wherein
    a width of the first bridge part is narrower than a width of the second bridge part.

5. The card body according to claim 2, wherein
    a width of the first bridge part is narrower than a width of the second bridge part.

6. The card body according to claim 3, wherein
    a width of the first bridge part is narrower than a width of the second bridge part.

7. A card body comprising:
    a card part onto which an IC module is to be mounted, the IC module including an IC chip and a contact pattern; and
    a bracket part to support the card part;
    wherein
    the card part includes a bevel, and
    the bracket part includes
    a hole formed at a circumference of the card part,
    a first bridge part connecting the bracket part and the card part,
    a second bridge part connecting the bracket part and the card part, a width of the second bridge part is wider than a width of the first bridge part,
    a first break-off line provided at both surfaces of a connection part between the card part and the first bridge part so that a thickness of the connection part is equal to a first thickness, and
    a second break-off line provided at both surfaces of a connection part between the card part and the second bridge part so that a thickness of the connection part is equal to a second thickness, the first thickness being shorter than the second thickness.

8. The card body according to claim 7, wherein
    the card part has a rectangular shape,
    the first bridge part is provided at a short side of the card part nearer to the bevel, and
    the second bridge part is provided at another short side of the card part as the opposite side of the first bridge part.

9. The card body according to claim 7, wherein
    the card part has a rectangular shape,
    the first bridge part is provided at a long side of the card part nearer to the bevel, and
    the second bridge part is provided at another long side of the card part as the opposite side of the first bridge part.

10. A manufacturing method for an IC card from a card body,
    the card body including a card part onto which an IC module is to be mounted, and a bracket part to support the card part,
    the IC module including an IC chip and a contact pattern,
    the method comprising:
    forming a bevel at the card part;
    forming a hole at a circumference of the card part on the bracket part;
    forming a first bridge part connecting the bracket part and the card part;
    forming a second bridge part connecting the bracket part and the card part at a farer position from the bevel than the first bridge part;
    forming a first break-off line at both surfaces of a connection part between the card part and the first bridge part so that a thickness of the connection part is equal to a first thickness; and forming a second break-off line at both surfaces of a connection part between the card part and the second bridge part so that a thickness of the connection part is equal to a second thickness.

11. An IC card manufactured from a card body, the card body comprising:
a card part onto which an IC module is to be mounted, the IC module including an IC chip and a contact pattern; and
a bracket part to support the card part; wherein
the card part includes a bevel,
the bracket part includes
a hole formed at a circumference of the card part,
a first bridge part connecting the bracket part and the card part,
a second bridge part connecting the bracket part and the card part, the second bridge part is provided at a farer position from the bevel than the first bridge part,
a first break-off line provided at both surfaces of a connection part between the card part and the first bridge part so that a thickness of the connection part is equal to a first thickness, and
a second break-off line provided at both surfaces of a connection part between the card part and the second bridge part so that a thickness of the connection part is equal to a second thickness, the first thickness being shorter than the second thickness,
the IC card is the card part separated from the bracket part by cutting the first break-off line and the second break-off line by pressure.

* * * * *